(12) United States Patent
Yang et al.

(10) Patent No.: US 11,099,079 B2
(45) Date of Patent: Aug. 24, 2021

(54) DEVICE AND METHOD FOR MONITORING ELECTRICAL EQUIPMENT FOR ELECTRICAL CONTACT OVERHEATING

(71) Applicant: Xi'an Jiaotong University, Xi'an (CN)

(72) Inventors: Aijun Yang, Xi'an (CN); Mingzhe Rong, Xi'an (CN); Xiaohua Wang, Xi'an (CN); Yang Liu, Xi'an (CN); Xiong Liu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 351 days.

(21) Appl. No.: 16/261,022

(22) Filed: Jan. 29, 2019

(65) Prior Publication Data

US 2020/0116572 A1 Apr. 16, 2020

(51) Int. Cl.
*G01K 5/28* (2006.01)
*G08B 29/14* (2006.01)

(52) U.S. Cl.
CPC ............ *G01K 5/28* (2013.01); *G08B 29/145* (2013.01)

(58) Field of Classification Search
None
See application file for complete search history.

(56) References Cited

U.S. PATENT DOCUMENTS

| | | | | |
|---|---|---|---|---|
| 4,330,808 A * | 5/1982 | Sawada | ................ | G01R 31/343 340/628 |
| 5,317,117 A * | 5/1994 | Bruski | ................... | H01H 9/342 218/153 |
| 5,420,440 A * | 5/1995 | Ketler | ................... | G01N 21/534 250/573 |
| 5,856,780 A * | 1/1999 | McGeehin | ........... | G08B 17/117 340/540 |
| 6,107,925 A * | 8/2000 | Wong | ..................... | G08B 17/10 340/628 |
| 6,121,883 A * | 9/2000 | Hatsir | .................... | G08B 17/04 340/449 |
| 6,512,192 B1 * | 1/2003 | Yee | ........................ | H01H 9/342 218/157 |
| 6,762,389 B1 * | 7/2004 | Crooks | .................. | H01H 9/342 218/157 |
| 9,420,663 B1 * | 8/2016 | Hsia | ....................... | H05B 45/50 |
| 2004/0090337 A1 * | 5/2004 | Nordvik | ............... | G08B 17/117 340/632 |
| 2004/0218330 A1 * | 11/2004 | Natili | ................... | H02H 1/0023 361/115 |

(Continued)

*Primary Examiner* — Curtis J King
(74) *Attorney, Agent, or Firm* — Dragon Sun Law Firm, PC; Jinggao Li, Esq.

(57) ABSTRACT

The present disclosure discloses a device for monitoring electrical equipment for electrical contact overheating, which comprises a gas collection device, a gas detection device, a data processing device, a data storage device and a display and early warning device. The present disclosure further discloses a method for monitoring electrical equipment for electrical contact overheating. The present disclosure can provide a basis for the evaluation and early warning of electrical contact overheating of electrical equipment based on the analysis of the thermally decomposed characteristic gases of the electrical joint compound, and has the characteristics of no space limitation, no need for a large number of layout points, high accuracy, simple structure and easy operation.

9 Claims, 3 Drawing Sheets

(56) References Cited

U.S. PATENT DOCUMENTS

| | | | | |
|---|---|---|---|---|
| 2004/0233062 A1* | 11/2004 | Chahrour | ............... | G08B 17/06 |
| | | | | 340/584 |
| 2007/0188335 A1* | 8/2007 | Shea | ...................... | G08B 17/10 |
| | | | | 340/628 |
| 2009/0161272 A1* | 6/2009 | Asokan | .............. | G01R 31/1218 |
| | | | | 361/43 |
| 2012/0234227 A1* | 9/2012 | Nichols | .................. | G01K 11/02 |
| | | | | 116/201 |
| 2014/0211829 A1* | 7/2014 | Nichols | .................. | G01K 11/06 |
| | | | | 374/159 |
| 2019/0140405 A1* | 5/2019 | Kralik | ............... | H01R 13/7036 |

\* cited by examiner

DEVICE AND METHOD FOR MONITORING ELECTRICAL EQUIPMENT FOR ELECTRICAL CONTACT OVERHEATING

CROSS REFERENCE TO RELATED APPLICATION

This application is based upon and claims priority to Chinese Patent Application No. 201811180501.7, filed on Oct. 10, 2018, the entire content of which is incorporated herein by reference.

TECHNICAL FIELD

The present disclosure relates to the technical field of electric power equipment, and particularly relates to a device and method for monitoring electrical equipment for electrical contact overheating.

BACKGROUND

At present, the domestic electric power system is constantly developing toward high voltage, long distance, large capacity, and intelligence. However, the ever-increasing voltage level and transmission capacity have caused the problem of electrical contact overheating of the electrical equipment in the electric power system. Common electrical contacts of the electrical equipment include busbar connections, high voltage isolation switches, feeders, tram pantographs, brushes, bridge lead connectors, etc. The electrical contact of the electrical equipment is a point contact between the conductors at the micro level, and the actual effective contact area is much smaller than the nominal surface area, resulting in a large contact resistance of electrical contact of the electrical equipment; and the heat generated by the electrical contact during the energization operation also causes an increase in contact resistance, finally resulting in serious accidents such as fire hazards caused by electrical contact overheating and ignition.

Electrical contact overheating is generally accompanied by persistent local abnormal high temperatures, occurs at electrical connections of the electrical equipment, and has the characteristics of high concealment and slow temperature rise in the early stage. The electrical contact of the electrical equipment is often coated with the electrical joint compound to reduce contact resistance and improve flow capacity. Under the action of localized overtemperature, the base oil or additive in the electrical joint compound will decompose and escape to some extent due to thermal stress, and produce characteristic gases such as acetaldehyde, methanol, propionaldehyde, etc.

These characteristic gases are closely related to the degree of overheating at the point of failure. Therefore, by detecting the decomposed gas components of the electrical joint compound at different overheating temperatures, the characteristic decomposed gas parameters capable of effectively characterizing the overheating temperature can be found, thereby providing a basis for the evaluation and early warning on the electrical contact overheating of the electrical equipment, and avoiding serious problems such as power outages, fire hazards and even explosions of the electric power system.

At present, the monitoring of electrical contact overheating of the electrical equipment is mainly realized by temperature measurement, including thermocouple thermometry, temperature measurement piece thermometry, infrared thermometry, optical fiber thermometry and wireless thermometry. These methods have achieved the monitoring of the electrical contact temperature of the electrical equipment to a certain extent, but at the same time there are also deficiencies. The thermocouple thermometry cannot directly indicate the temperature value, nor record the historical data; the temperature measurement piece thermometry needs manual timing inspection, it can only be used after the failure, and the early warning of the failure cannot be realized; the infrared thermometry requires that the object to be measured and the measuring instrument cannot be blocked, and in order to ensure safety, the door of the electrical equipment such as the switch cabinet cannot be opened during operation, so the infrared thermometry cannot reflect the actual temperature of the electrical contact of the electrical equipment during operation; the optical fiber thermometry uses the optical fiber to upload the temperature measured by the temperature sensor to corresponding equipment, so that the creepage distance of the original air-insulated portion is greatly shortened due to the direct connection of the optical fiber, thereby reducing the insulation level of the high-voltage electric power equipment; and the wireless thermometry solves the insulation problem of the optical fiber thermometry by using the temperature sensor and the radio frequency technology, but the power supply problem of the sensor has not been well solved.

SUMMARY

In view of the above deficiencies, the object of the present disclosure is to provide a device and method for monitoring electrical contact overheating of the electrical equipment, which can provide a basis for the evaluation and early warning of electrical contact overheating of the electrical equipment based on the analysis of the thermally decomposed characteristic gases of the electrical joint compound, and have the characteristics of no space limitation, no need for a large number of layout points, high accuracy, simple structure and easy operation.

In order to achieve the above object, the technical solutions of the present disclosure are described in detail below.

A device for monitoring electrical equipment for electrical contact overheating comprises:

a gas collection device used for collecting gas in a space where the electrical equipment is located;

a gas detection device comprising a gas sensor array for different characteristic gases and used for detecting different characteristic gases of the collected gas;

a data storage device used for storing a response threshold of each gas sensor during normal operation of the electrical equipment, a maximum received energy threshold of a conductor material of the electrical equipment, a received energy value of an electrical contact portion of the electrical equipment, and an electrical contact temperature value of the electrical equipment;

a data processing device comprising a preprocessing device and a comparison device, wherein the preprocessing device is used for preprocessing a detection result of the gas detection device, and determining the response value of each gas sensor and the electrical contact temperature value of the electrical equipment according to the preprocessing result; and the comparison device is used for calculating an energy accumulated value received by the electrical contact portion of the electrical equipment according to the response value of each gas sensor, respectively comparing the response value of the gas sensor and the energy accumulated value received by the electrical contact portion of the electrical equipment with the response threshold of each gas sensor stored in the data storage device and the maximum received energy threshold of the conductor material of the electrical equipment, and outputting the comparison result; and a display and early warning device used for displaying the name of the detected characteristic gas and the possible overheating temperature and giving out necessary early warning information according to the comparison result.

Preferably, the gas collection device comprises a solenoid valve and a vacuum pump.

Preferably, the data processing device comprises an analog-to-digital converter and a microprocessor.

Preferably, the display and early warning device comprises a display with a buzzer.

Preferably, the device further comprises a gas passage, used for transporting the collected gas.

Preferably, a material for preparing the gas passage comprises any one of the following: polyethylene, polytetrafluoroethylene, polyurethane and silica gel.

The present disclosure further provides a method for monitoring electrical equipment for electrical contact overheating, comprising the following steps:

S100: collecting, by the gas collection device, gas in a space around the electrical equipment;

S200: detecting, by the gas detection device, different characteristic gases of the collected gas;

S300: preprocessing, by the data processing device, the gas detected by the gas detection device, and determining a response value of each gas sensor and an electrical contact temperature value of the electrical equipment according to the preprocessing result, and calculating an energy accumulated value received by the electrical contact portion of the electrical equipment by using the response value of each gas sensor;

S400: respectively comparing the response value of each gas sensor and the energy accumulated value received by the electrical contact portion in the step S300 with the response threshold of each gas sensor during normal operation of the electrical equipment and the maximum received energy threshold of the conductor material of the electrical equipment stored in the data storage device; and S500: based on the comparison result of the step S400, giving out, by the display and early warning device, the corresponding early warning information or overhaul signal.

Preferably, in the step S300, the calculation formulae for calculating the energy value received by the electrical contact portion of the electrical equipment by using the response value of each gas sensor are as follows:

$$Q = \sum_{i=1}^{N} Q_i$$

$$Q_i = K \int_{t_{i0}}^{t_{i1}} (\Delta n_i)^\alpha dt$$

wherein Q is the total energy received by the conductor, N is the number of consecutive gas detections when the response value of each gas sensor exceeds the threshold for the first time until the response value of each gas sensor no longer rises, $Q_i$ is the energy value calculated at the time of the $i^{th}$ detection, K is the proportional coefficient, $t_{i0}$ is the start time of the $i^{th}$ gas detection, $t_{i1}$ is the finish time of the $i^{th}$ gas detection, $\Delta n_i$ is the increment of the response value of each gas sensor in the $i^{th}$ gas detection process, and $\alpha$ is the weighting coefficient.

Preferably, in the step S400, if the response value of each gas sensor does not exceed the normal threshold, it indicates that the electrical contact of the electrical equipment is not overheated; if the response value of the one or more gas sensors exceeds the normal threshold, it indicates that the electrical contact of the electrical equipment is about to overheat; and if the energy accumulated value calculated by using the response value of each gas sensor exceeds the set maximum received energy threshold of the conductor material, it indicates that the electrical equipment is severely overheated.

Compared with the prior art, the present disclosure has the following advantages:

1. by analyzing the gas components, the present disclosure can provide a basis for evaluation and early warning of electrical contact overheating of electrical equipment, has the characteristics of high accuracy, simple structure, easy operation and the like, and can detect the overheating failure of the electrical contact of the electrical equipment at the forming stage; and 2. the gas components decomposed at the time of overheating from the electrical joint compound coated on the electrical contact of the electrical equipment are utilized to characterize the temperature (energy) of the overheated portion, and an energy accumulation algorithm is introduced to realize intelligent early warning of different degrees of overheating.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

The technical solutions of the present disclosure will be described in detail below with reference to the embodiments and the accompanying drawings.

Figure 1:
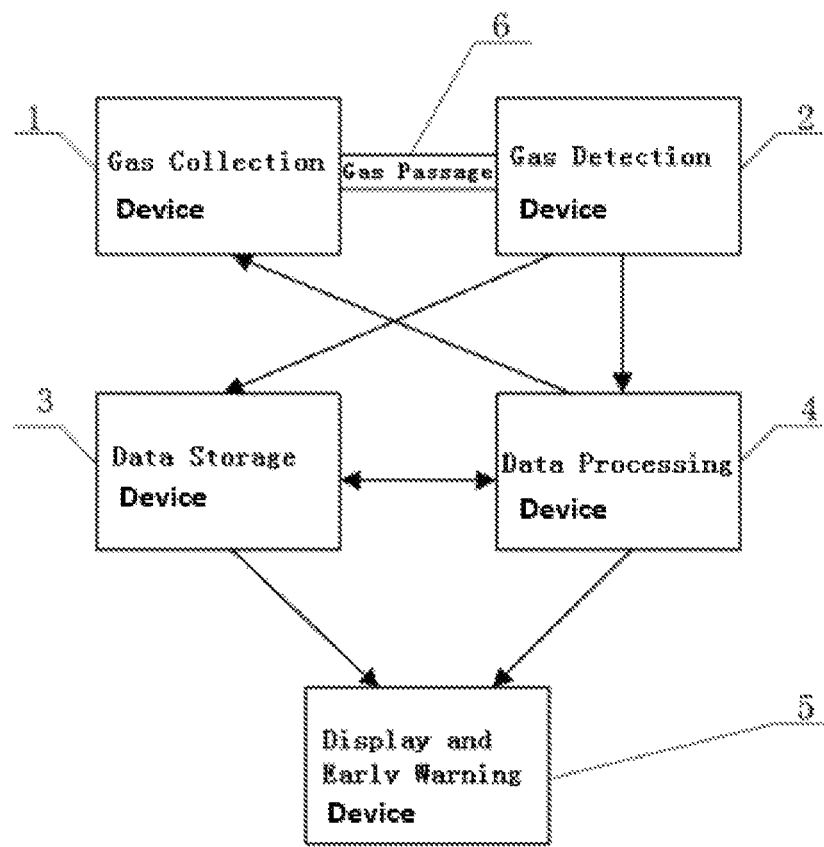
FIG. 1 is a structure diagram of the device for monitoring electrical equipment for electrical contact overheating according to the present disclosure.

As shown in FIG. 1, a device for monitoring electrical equipment for electrical contact overheating comprises a gas collection device 1, used for collecting gas in a space where the electrical equipment is located; a gas detection device 2, comprising a gas sensor array for different characteristic gases and used for detecting different characteristic gases of the collected gas; a data storage device 3, used for storing a response threshold of each gas sensor during normal operation of the electrical equipment, a maximum received energy threshold of a conductor material of the electrical equipment, a received energy value of an electrical contact portion of the electrical equipment, and an electrical contact temperature value of the electrical equipment; a data processing device 4, comprising a preprocessing device and a comparison device, wherein the preprocessing device is used for preprocessing a detection result of the gas detection device, and determining the response value of each gas sensor and the electrical contact temperature value of the electrical equipment according to the preprocessing result; the comparison device is used for calculating an energy accumulated value received by the electrical contact portion of the electrical equipment according to the response value of each gas sensor, respectively comparing the response value of each gas sensor and the energy accumulated value received by the electrical contact portion of the electrical equipment with the response threshold of each gas sensor stored in the data storage device and the maximum received energy threshold of the conductor material of the electrical equipment, and outputting the comparison result; and a display and early warning device 5, used for displaying the name of the detected characteristic gas and the possible overheating temperature and giving out necessary early warning information according to the comparison result.

The above embodiment completely discloses a device for monitoring electrical equipment for electrical contact overheating. This embodiment characterizes the temperature of the overheated portion of the electrical contact of the electrical equipment by detecting the gas in the space around the electrical equipment, has the advantages of no space limitation, no need for a large number of layout points, high accuracy, simple structure, easy operation and the like, and well overcomes many defects in the prior art.

In another embodiment, the gas collection device 1 comprises a solenoid valve and a vacuum pump.

In this embodiment, the solenoid valve and the vacuum pump are activated under the action of a control signal to collect the gas in the space where the electrical contact of the electrical equipment is located, and the collected gas is used for gas identification and detection by the subsequent device.

In another embodiment, the data processing device 4 comprises an analog-to-digital converter and a microprocessor.

In this embodiment, the analog-to-digital converter is used for converting gas information detected by the gas detection device 2 from an analog signal to a digital signal, and transmitting the digital signal to the microprocessor; and the microprocessor is used for controlling the solenoid valve, the vacuum pump and a warning device, and also used for analyzing the digital signal received from the analog-to-digital converter to obtain the type and concentration conforming to the thermally decomposed characteristic gases of the electrical joint compound, so as to judge the temperature of the electrical contact of the electrical equipment, the response value of each gas sensor and the energy value received by the overheated portion by using the combination of different types of characteristic gases, thereby evaluating the degree of overheating of the electrical contact of the electrical equipment.

In another embodiment, the display and early warning device 5 comprises a display with a buzzer.

In this embodiment, when it is detected that the electrical contact of the electrical equipment may be overheated, the display of the display and early warning device 5 is always on until the failure disappears, and the display gives out the name of the detected characteristic gas, the possible overheating temperature and maintenance recommendations. In addition, when it is detected for a long time that there may be overheating and the energy value calculated from the characteristic gas exceeds the energy threshold, the display buzzer will sound and give out the highest-level warning to remind the duty personnel of immediate overhaul and failure clearing.

In another embodiment, the device further comprises a gas passage 6, used for transporting the collected gas.

In this embodiment, the gas passage 6 can achieve the effect of preventing the gas collected by the gas collection device from leaking during the transportation to the gas detection device.

In another embodiment, a material for preparing the gas passage 6 comprises any one of the following: polyethylene, polytetrafluoroethylene, polyurethane and silica gel.

In this embodiment, the gas passage 6 should have the characteristic of not reacting with the thermally decomposed gases of the electrical joint compound. Therefore, it is necessary to select a material having stable chemical properties, good corrosion resistance and good electrical insulation as the preparation material, and the polyethylene, polytetrafluoroethylene, polyurethane and silica gel can meet the above requirements.

Figure 2:
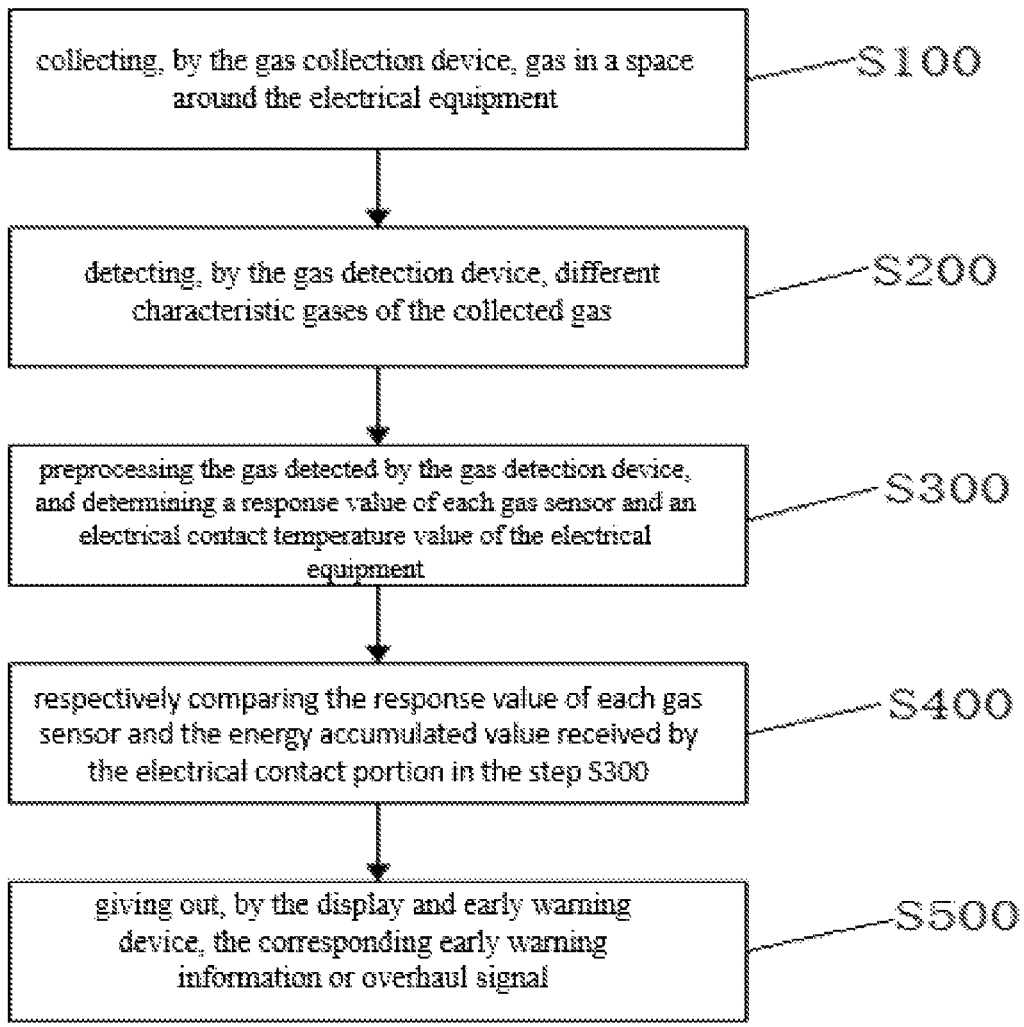
FIG. 2 is a flow chart of the method for monitoring electrical equipment for electrical contact overheating according to the present disclosure.

As shown in FIG. 2, the present disclosure further provides a method for monitoring electrical equipment for electrical contact overheating, which comprises the following steps:

S100: collecting, by the gas collection device 1, gas in a space around the electrical equipment;

S200: detecting, by the gas detection device 2, different characteristic gases of the collected gas;

S300: preprocessing, by the data processing device 4, the gas detected by the gas detection device 2, and determining a response value of each gas sensor and an electrical contact temperature value of the electrical equipment according to the preprocessing result, and calculating an energy accumulated value received by the electrical contact portion of the electrical equipment by using the response value of each gas sensor;

S400: respectively comparing the response value of each gas sensor and the energy accumulated value received by the electrical contact portion in the step S300 with the response threshold of each gas sensor during normal operation of the electrical equipment and the maximum received energy threshold of the conductor material of the electrical equipment stored in the data storage device; and S500: based on the comparison result of the step S400, giving out, by the display and early warning device 5, the corresponding early warning information or overhaul signal.

In a specific implementation of the step S100, after the data processing device 3 gives out the control signal, the solenoid valve in the gas collection device 1 is opened, the vacuum pump extracts the gas in the space where the electrical equipment is located, and then the vacuum pump and the solenoid valve are sequentially shut down.

In a specific implementation of the step S200, the gas detection device 2 comprises a sensor array composed of multiple discrete sensors. The cross-sensitivity of the gas sensor array to the multiple gases is used to analyze and detect the type and concentration of the characteristic gas, and the gas information is converted into an analog electrical signal as input data of the data processing device 3.

In a specific implementation of the step S300, the data processing device 3 preprocesses the detection signal of the gas detection device 2 to complete signal filtering, conversion and feature extraction. The type and concentration of the characteristic gas component are analyzed to judge the temperature of the overheated portion, the response value of each gas sensor is utilized to calculate the energy received by the electrical contact portion in the potential overheating, and meanwhile, the energy accumulated value of the characteristic gas in several consecutive gas detections. If the response value of each gas sensor in the two consecutive detections does not exceed the normal threshold, the energy accumulated value calculated based on the response value of each gas sensor is set to zero.

The calculation formulae for calculating the accumulated energy received by the electrical contact portion of the electrical equipment by using the response value of each gas sensor are as follows:

$$Q = \sum_{i=1}^{N} Q_i \quad (1)$$

$$Q_i = K \int_{t_{i0}}^{t_{i1}} (\Delta n_i)^\alpha dt \quad (2)$$

wherein Q is the total energy received by the conductor, N is the number of consecutive gas detections when the response value of each gas sensor exceeds the threshold for the first time until the response value of each gas sensor no longer rises, $Q_i$ is the energy value calculated at the time of the $i^{th}$ detection, K is the proportional coefficient, $t_{i0}$ is the start time of the $i^{th}$ gas detection, $t_{i1}$ is the finish time of the $i^{th}$ gas detection, $\Delta n_i$ is the increment of the response value of each gas sensor in the $i^{th}$ gas detection process, and α is the weighting coefficient.

In a specific implementation of the step S400, the data result obtained in the step S300 is compared with the data stored in the data storage device 4, if the response value of each gas sensor does not exceed the normal threshold, it indicates that the electrical contact of the electrical equipment is not overheated; if the response value of the one or more gas sensors exceeds the normal threshold, it indicates that the electrical contact of the electrical equipment is about to overheat; and if the energy accumulated value calculated by using the response value of each gas sensor exceeds the set maximum received energy threshold of the conductor material, it indicates that the electrical equipment is severely overheated.

In a specific implementation of the step S500, based on the comparison result of the step S400, the related early warning signal or overhaul information is displayed by the display and early warning device 5. When it is detected that the electrical contact of the electrical equipment may be overheated, the display of the display and early warning device 5 is always on until the failure disappears, and the display gives out the name of the detected characteristic gas, the possible overheating temperature and maintenance recommendations. In addition, when it is detected for a long time that there may be overheating and the energy value calculated from the characteristic gas exceeds the energy threshold, and the display buzzer will sound and give out the highest-level warning to remind the duty personnel of immediate overhaul and failure clearing.

The present disclosure is capable of characterizing the temperature of the overheated portion of the electrical contact of the electrical equipment by detecting the thermally decomposed characteristic gases of the electrical joint compound and then giving out early warning, the performance of the present disclosure is tested below.

Figure 3:
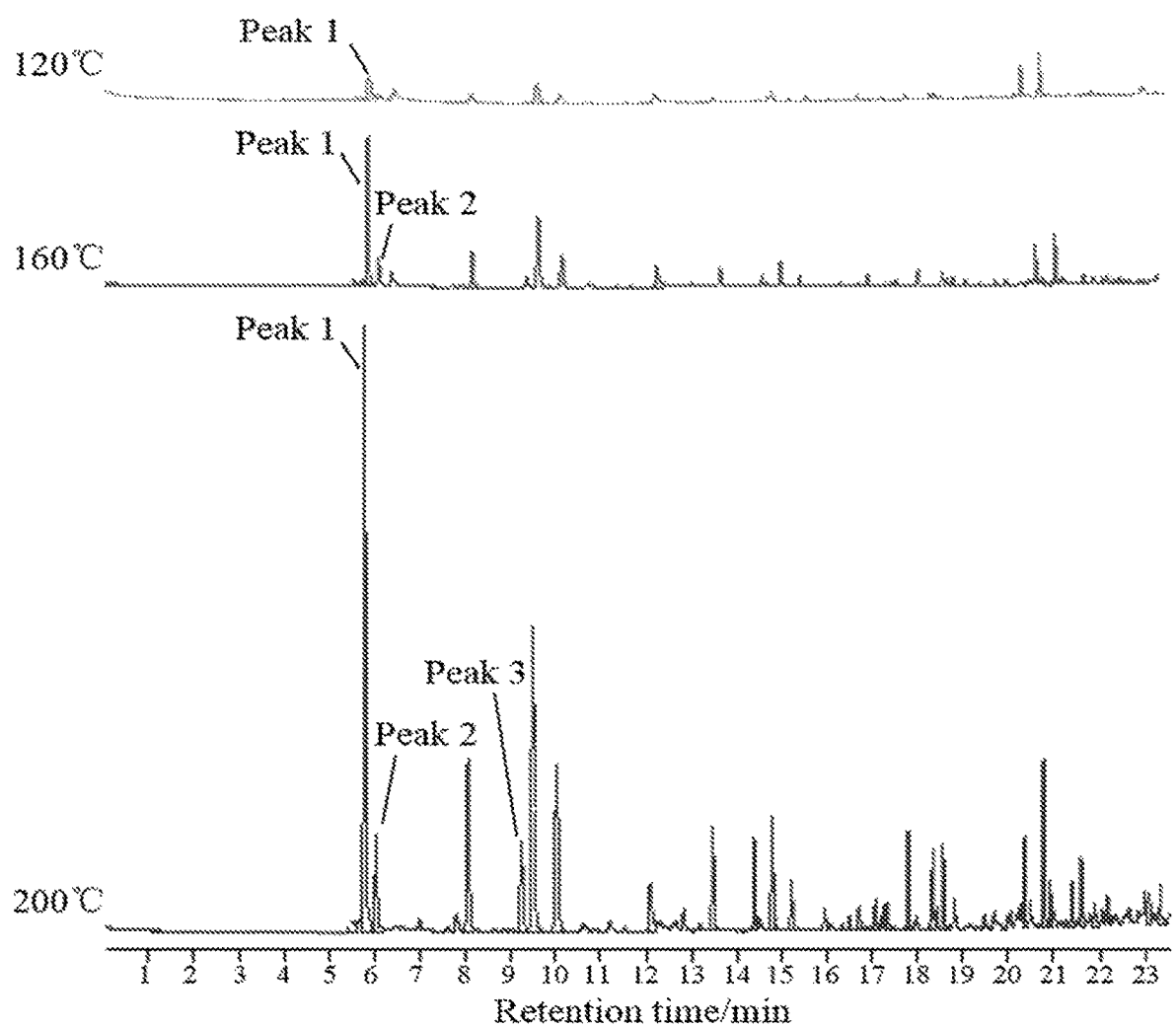
FIG. 3 is a chromatogram of volatile gas components in an overheated state of the electrical joint compound according to the present disclosure.

In an experimental example, acetaldehyde, methanol and propionaldehyde are selected as the characteristic gases of electrical contact overheating of the electrical equipment, and correspondingly, the gas detection device 2 comprises an acetaldehyde gas sensor, a methanol gas sensor and a propionaldehyde gas sensor. A gas chromatography-mass spectrometer is used to detect the volatile gas components of the common electrical joint compound of the electric power system in the overheated state of 120° C., 160° C. and 200° C., and the corresponding chromatogram is shown in FIG. 3. It can be seen that the amplitude of each volatile gas component in the electrical joint compound increases as the temperature rises, and a new volatile gas appears as the temperature rises. For example, characteristic peaks Peak 1, Peak 2 and Peak 3 appear at 120° C., 160° C. and 200° C. respectively, and the amplitudes of these peaks increase as the temperature rises. Correspondingly, the characteristic gases corresponding to the characteristic peaks Peak 1, Peak 2 and Peak 3 are acetaldehyde, methanol and propionaldehyde respectively. When the temperature of the failure portion reaches 120° C., 160° C. and 200° C. respectively, the thermally decomposed characteristic gases of the electrical joint compound are acetaldehyde, methanol and propionaldehyde respectively.

The above description of the embodiments is only to assist in understanding the present disclosure and its core concepts. It should be noted that those skilled in the art can make several improvements and modifications to the present disclosure without departing from the principles of the present disclosure, and such improvements and modifications also fall into the scope of the appended claims.

The invention claimed is:

1. A device for monitoring electrical equipment for electrical contact overheating, comprising:
   a gas collection device used for collecting gas in a space where the electrical equipment is located;
   a gas detection device comprising a gas sensor array for different characteristic gases and used for detecting different characteristic gases of the collected gas;
   a data storage device used for storing a response threshold of each gas sensor during normal operation of the electrical equipment, a maximum received energy threshold of a conductor material of the electrical equipment, a received energy value of an electrical contact portion of the electrical equipment, and an electrical contact temperature value of the electrical equipment;
   a data processing device comprising a preprocessing device and a comparison device, wherein the preprocessing device is used for preprocessing a detection result of the gas detection device, and determining the response value of each gas sensor and the electrical contact temperature value of the electrical equipment according to the preprocessing result; and the comparison device is used for calculating an energy accumulated value received by the electrical contact portion of the electrical equipment according to the response value of each gas sensor, respectively comparing the response value of each gas sensor and the energy accumulated value received by the electrical contact portion of the electrical equipment with the response threshold of each gas sensor stored in the data storage device and the maximum received energy threshold of the conductor material of the electrical equipment, and outputting the comparison result; and
   a display and early warning device used for displaying the name of the detected characteristic gas and the possible overheating temperature and giving out necessary early warning information according to the comparison result.

2. The device according to claim 1, wherein the gas collection device comprises a solenoid valve and a vacuum pump.

3. The device according to claim 1, wherein the data processing device comprises an analog-to-digital converter and a microprocessor.

4. The device according to claim 1, wherein the display and early warning device comprises a display with a buzzer.

5. The device according to claim 1, wherein the device further comprises a gas passage used for transporting the collected gas.

6. The device according to claim 5, wherein a material for preparing the gas passage comprises any one of the following: polyethylene, polytetrafluoroethylene, polyurethane and silica gel.

7. A method for monitoring electrical equipment for electrical contact overheating by using the device according to claim 1, comprising the following steps:
S100: collecting, by the gas collection device, gas in a space around the electrical equipment;
S200: detecting, by the gas detection device, different characteristic gases of the collected gas;
S300: preprocessing, by the data processing device, the gas detected by the gas detection device, and determining a response value of each gas sensor and an electrical contact temperature value of the electrical equipment according to the preprocessing result, and calculating an energy accumulated value received by the electrical contact portion of the electrical equipment by using the response value of each gas sensor;
S400: respectively comparing the response value of each gas sensor and the energy accumulated value received by the electrical contact portion in the step S300 with the response threshold of each gas sensor during normal operation of the electrical equipment and the maximum received energy threshold of the conductor material of the electrical equipment stored in the data storage device; and S500: based on the comparison result of the step S400, giving out, by the display and early warning device, the corresponding early warning information or overhaul signal.

8. The method according to claim 7, wherein, in the step S300, the calculation formulae for calculating the energy value received by the electrical contact portion of the electrical equipment by using the response value of each gas sensor are as follows:

$$Q = \sum_{i=1}^{N} Q_i$$

$$Q_i = K \int_{t_{i0}}^{t_{i1}} (\Delta n_i)^\alpha dt$$

wherein Q is the total energy received by the conductor, N is the number of consecutive gas detections when the response value of each gas sensor exceeds the threshold for the first time until the response value of each gas sensor no longer rises, $Q_i$ is the energy value calculated at the time of the $i^{th}$ detection, K is the proportional coefficient, $t_{i0}$ is the start time of the $i^{th}$ gas detection, $t_{i1}$ is the finish time of the $i^{th}$ gas detection, $\Delta n_i$ is the increment of the response value of each gas sensor in the $i^{th}$ gas detection process, and $\alpha$ is the weighting coefficient.

9. The method according to claim 7, wherein in the step S400, if the response value of each gas sensor does not exceed the normal threshold, it indicates that the electrical contact of the electrical equipment is not overheated; if the response value of the one or more gas sensors exceeds the normal threshold, it indicates that the electrical contact of the electrical equipment is about to overheat; and if the energy accumulated value calculated by using the response value of each gas sensor exceeds the set maximum received energy threshold of the conductor material, it indicates that the electrical equipment is severely overheated.

* * * * *